(12) United States Patent
Mantha et al.

(10) Patent No.: US 9,656,429 B1
(45) Date of Patent: May 23, 2017

(54) SYSTEMS AND METHODS FOR STRUCTURALLY ANALYZING AND PRINTING PARTS

(71) Applicant: Arevo, Inc., Santa Clara, CA (US)

(72) Inventors: Chandrashekar Mantha, Santa Clara, CA (US); Peter Woytowitz, Santa Clara, CA (US); Wiener Mondesir, Santa Clara, CA (US); Hemant Bheda, Santa Clara, CA (US)

(73) Assignee: AREVO, INC., Santa Clara, CA (US)

( * ) Notice: Subject to any disclaimer, the term of this patent is extended or adjusted under 35 U.S.C. 154(b) by 0 days.

(21) Appl. No.: 15/232,767

(22) Filed: Aug. 9, 2016

(51) Int. Cl.
*G06F 17/50* (2006.01)
*B29C 67/00* (2017.01)
*B33Y 10/00* (2015.01)
*B33Y 50/02* (2015.01)

(52) U.S. Cl.
CPC ...... *B29C 67/0088* (2013.01); *B29C 67/0059* (2013.01); *B33Y 10/00* (2014.12); *B33Y 50/02* (2014.12)

(58) Field of Classification Search
CPC . B29C 67/0088; B29C 67/0059; B33Y 50/02; B33Y 10/00
USPC .............................................................. 703/1
See application file for complete search history.

(56) References Cited

U.S. PATENT DOCUMENTS

| | | | |
|---|---|---|---|
| 2010/0312364 A1* | 12/2010 | Eryilmaz | G05B 11/42 700/30 |
| 2014/0232035 A1 | 8/2014 | Bheda | |
| 2014/0328963 A1* | 11/2014 | Mark | B29C 67/0088 425/143 |
| 2016/0176118 A1 | 6/2016 | Reese et al. | |
| 2016/0236414 A1 | 8/2016 | Reese et al. | |
| 2016/0236416 A1 | 8/2016 | Bheda et al. | |
| 2016/0266573 A1 | 9/2016 | Bheda et al. | |
| 2016/0271880 A1 | 9/2016 | Bheda et al. | |
| 2016/0297142 A1 | 10/2016 | Bheda et al. | |

OTHER PUBLICATIONS

Co-pending U.S. Appl. No. 14/682,067, filed Apr. 8, 2015.

* cited by examiner

*Primary Examiner* — Saif Alhija
(74) *Attorney, Agent, or Firm* — Wilson Sonsini Goodrich & Rosati

(57) ABSTRACT

Methods and systems are disclosed for structurally analyzing and/or three-dimensional printing a part. The method may comprise receiving a model of the part for three-dimensional printing from a material comprising a matrix, receiving one or more properties for the material, and using the model, determining a print head tool path for use during the three-dimensional printing of the part. The method may also comprise determining a trajectory of at least one stiffness-contributing portion of the material based at least in part on the print head tool path, determining a performance of the part based at least in part on the one or more properties and the trajectory, and electronically outputting the performance of the part.

29 Claims, 6 Drawing Sheets

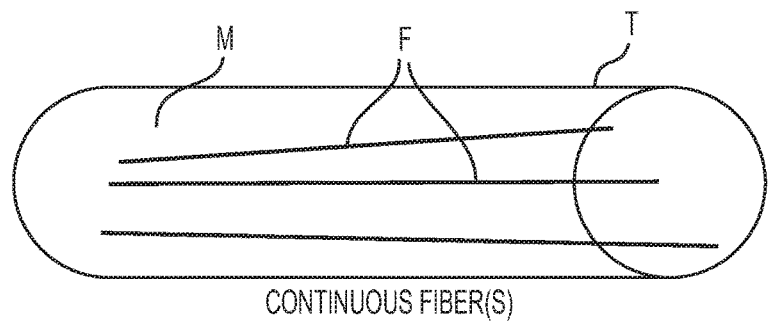
FIG. 2
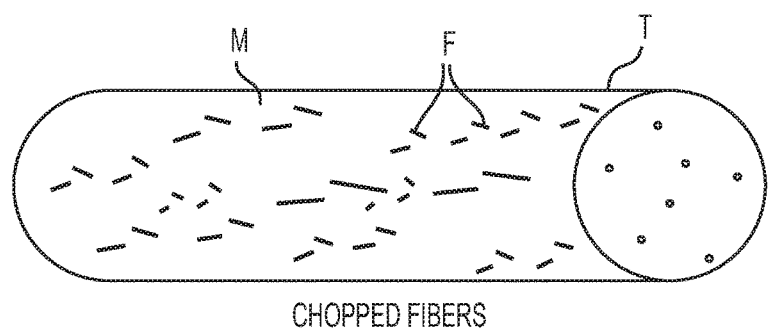
FIG. 3
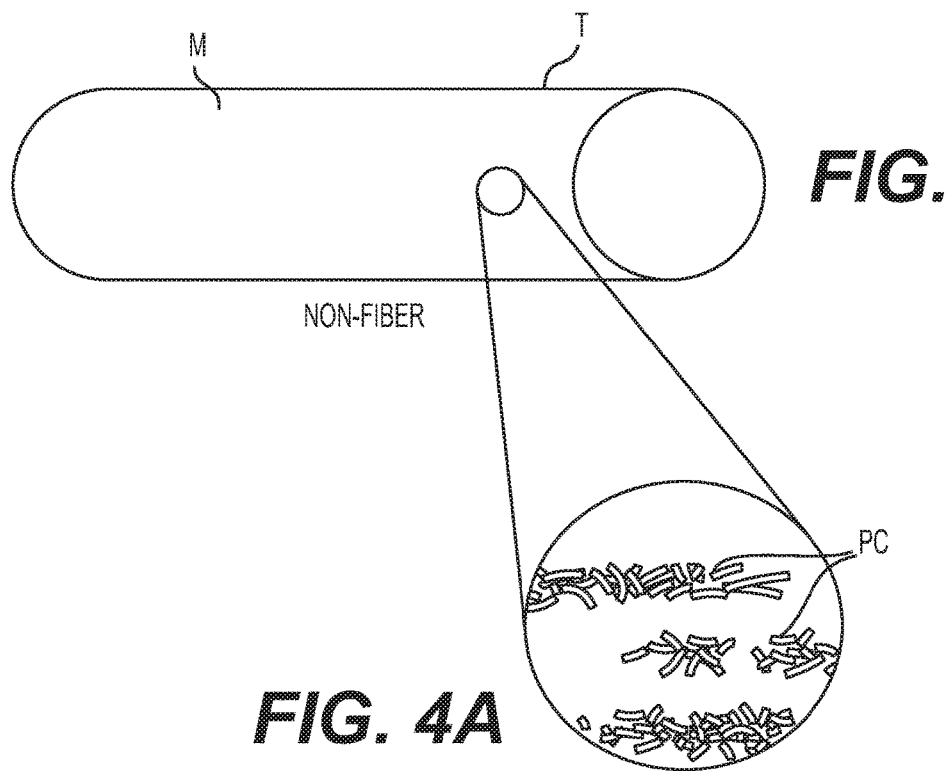
FIG. 4
FIG. 4A

SYSTEMS AND METHODS FOR STRUCTURALLY ANALYZING AND PRINTING PARTS

BACKGROUND

Additive manufacturing is a process of creating three-dimensional parts by depositing overlapping layers of material under the guided control of a computer. Techniques of additive manufacturing include, without limitation, fused deposition modeling (FDM), fused filament fabrication (FFF), and Plastic Jet Printing (PJP). Using this technique, a material (e.g., a heated and/or pressurized thermoplastic) passes through a print head. The print head is moved in a predefined trajectory (a.k.a., a tool path) as the material discharges from the print head, such that the material is laid down in a particular pattern and shape of overlapping layers. The material, after exiting the print head, hardens into a final form.

In some applications, one or more fibers (e.g., one or more continuous or chopped fibers) move through the print head along with the material to act as reinforcement for the final solidified part. This process may be referred to as reinforced filament fusion (RFF).

Although FDM, FFF, PJP, and RFF manufacturing of structures can be an efficient way to produce high-performance and geometrically complex structures, the performance of the printed structures may be difficult to predict. In particular, mechanical properties (e.g., stiffness, strength, etc.) of such printed structures are anisotropic in nature, exhibiting different characteristics in X, Y, and Z directions.

Historically, printed structures have been created using a trial-and-error method, where the part was printed, tested, and re-printed in a different manner until a successful part was produced. This process, while ultimately successful, can also be time consuming and expensive.

Recently, finite element analysis (FEA) has been used with some success to predict the performance of a printed part. In particular, printed parts have been analyzed using FEA, for example based on characteristics of the material and bind sites located between layers of deposited material. When using FEA, a physical part may not be printed until a theoretical design is created that may pass minimum FEA thresholds.

SUMMARY

While a finite element analysis (FEA) approach to designing printed parts may improve performance predictability and reduce resource wasting, recognized herein are various issues with FEA. For example, FEA may not fully account for the actual tool path or the anisotropic nature of the printed structures. Methods and systems provided herein may overcome one or more problems identified above. The present disclosure provides analysis systems and methods. In some cases, such systems and methods are used for structurally analyzing printed parts or objects.

In an aspect, the present disclosure provides a method for structurally analyzing and/or three-dimensional printing a part, comprising (a) receiving, in computer memory, a model of the part for three-dimensional printing from a material comprising a matrix and fiber material; (b) receiving, in computer memory, one or more properties for the material; (c) using the model, determining a print head tool path for use during the three-dimensional printing of the part; (d) determining a trajectory of at least one stiffness-contributing portion of the material based at least in part on the print head tool path; (e) using one or more computer processors to determine a performance of the part based at least in part on the one or more properties received in (b) and the trajectory of the at least one stiffness-contributing portion determined in (d); and (f) electronically outputting the performance of the part determined in (e).

In some embodiments, the at least one stiffness-contributing portion is at least one of a continuous fiber, chopped fibers, and polymer chains.

In some embodiments, the method further comprises generating a virtual mesh of analytic elements within the model of the part, wherein determining the trajectory of the at least one stiffness-contributing portion comprises determining the trajectory of the at least one stiffness-contributing portion through each of the analytic elements. In some embodiments, further comprising determining a three-dimensional stiffness of each of the analytic elements based at least in part on (i) the trajectory of the at least one stiffness-contributing portion through each of the analytic elements and (ii) the one or more properties of the material and the at least one stiffness-contributing portion, wherein (e) comprises determining the performance of the part based at least in part on an aggregation of three-dimensional stiffnesses of each of the analytic elements.

In some embodiments, determining the three-dimensional stiffness of each of the analytic elements comprises: determining intersection points and directional vectors of the at least one stiffness contributing element within each of the analytic elements; determining a volume of the analytic elements consumed by the at least one stiffness contributing element using the intersection points; and determining the three-dimensional stiffness of each of the analytic elements using the volume of the analytic elements consumed by the at least one stiffness contributing element, the one or more properties of the material, one or more properties of the at least one stiffness contributing element, and the directional vectors.

In some embodiments, the performance of the part determined in (e) comprises at least one of a displacement field and a stress field of the part. In some embodiments, further comprising receiving use information for the part, and wherein (e) comprises determining at least one of the displacement field and the stress field of the part based at least in part on the use information.

In some embodiments, (f) comprises displaying the performance of the part determined in (e) on a user interface. In some embodiments, displaying the performance of the part comprises displaying on the user interface a graphical representation of the performance determined in (e) overlapped with one or more of the model of the part and the print head tool path. In some embodiments, the method further comprises receiving a control instruction from a user regarding viewing of progression of the print head during virtual three-dimensional printing of the part; and responsively displaying on the user interface the performance overlapped with a corresponding portion of the print head tool path on the part.

In some embodiments, the method further comprises generating a comparison of the performance of the part against a reference performance; and using the comparison to generate an additional print head tool path.

In some embodiments, the method further comprises using the print head to generate the part along the print head tool path. In some embodiments, the print head additively generates the part.

In some embodiments, the part is generated if the performance determined in (e) meets a reference performance. In some embodiments, the method further comprises receiving instruction(s) from a user to generate the part prior to using the print head to generate the part.

In some embodiments, the material further comprises a fiber.

Another aspect provides a non-transitory computer-readable medium comprising machine-executable code that, upon execution by one or more computer processors, implements a method for structurally analyzing and/or three-dimensional printing a part, the method comprising: (a) receiving, in computer memory, a model of the part for three-dimensional printing from a material comprising a matrix and fiber material; (b) receiving, in computer memory, one or more properties for the material; (c) using the model, determining a print head tool path for use during the three-dimensional printing of the part; (d) determining a trajectory of at least one stiffness-contributing portion of the material based at least in part on the print head tool path; (e) determining a performance of the part based at least in part on the one or more properties received in (b) and the trajectory of the at least one stiffness-contributing portion determined in (d); and (f) electronically outputting the performance of the part determined in (e).

In some embodiments, the at least one stiffness-contributing portion is at least one of a continuous fiber, chopped fibers, and polymer chains.

In some embodiments, the method further comprises generating a virtual mesh of analytic elements within the model of the part, and wherein determining the trajectory of the at least one stiffness-contributing portion comprises determining the trajectory of the at least one stiffness-contributing portion through each of the analytic elements.

In some embodiments, the method further comprises determining a three-dimensional stiffness of each of the analytic elements based at least in part on (i) the trajectory of the at least one stiffness-contributing portion through each of the analytic elements and (ii) the one or more properties of the material and the at least one stiffness-contributing portion, wherein (e) comprises determining the performance of the part based at least in part on aggregation of three-dimensional stiffnesses of each of the analytic elements.

In some embodiments, determining the three-dimensional stiffness of each of the analytic elements comprises: determining intersection points and directional vectors of the at least one stiffness contributing element within each of the analytic elements; determining a volume of the analytic elements consumed by the at least one stiffness contributing element using the intersection points; and determining the three-dimensional stiffness of each of the analytic elements using the volume of the analytic elements consumed by the at least one stiffness contributing element, the one or more properties of the material, one or more properties of the at least one stiffness contributing element, and the directional vectors.

In some embodiments, the performance of the part determined in (e) comprises at least one of a displacement field and a stress field of the part. In some embodiments, the method further comprises receiving use information for the part, and wherein (e) comprises determining at least one of the displacement field and the stress field of the part based at least in part on the use information.

In some embodiments, (f) comprises displaying the performance of the part determined in (e) on a user interface. In some embodiments, displaying the performance of the part comprises displaying on the user interface a graphical representation of the performance determined in (e) overlapped with one or more of the model of the part and the print head tool path. In some embodiments, the method further comprises: receiving a control instruction from a user regarding viewing of progression of the print head during virtual three-dimensional printing of the part; and responsively displaying on the user interface the performance overlapped with a corresponding portion of the print head tool path on the part.

In some embodiments, the method further comprises generating a comparison of the performance of the part against a reference performance; and generating an additional print head tool path using the comparison. In some embodiments, the method further comprises using the print head to generate the part along the print head tool path. In some embodiments, the part is generated if the performance determined in (e) meets a reference performance.

In another aspect, a system for structurally analyzing and/or three-dimensional printing a part is provided. The system comprises computer memory comprising computer-executable instructions stored therein for analyzing and/or three-dimensional printing the part; and one or more computer processors in electrical communication with the computer memory and programmed to execute the computer-executable instructions to: (a) receive, in the computer memory, a model of the part for three-dimensional printing from a material comprising a matrix and fiber material; (b) receive, in the computer memory, one or more properties of the material; (c) using the model, determine a print head tool path for use during the three-dimensional printing of the part; (d) determine a trajectory of the at least one stiffness-contributing portion of the material based at least in part on the print head tool path; (e) determine a performance of the part based at least in part on the one or more properties received in (b) and the trajectory of the at least one stiffness-contributing portion determined in (d); and (f) electronically output the performance of the part determined in (e).

In another aspect, the present disclosure provides a method for structurally analyzing a printed part (or object). The method may include receiving a model of the part to be printed from a material consisting of at least a matrix, receiving properties for the material, and determining a print head tool path for printing the part. The method may also include determining a trajectory of at least one stiffness-contributing portion of the material. The trajectory may be determined based on the print head tool path. The method may further include predicting a performance of the part based on the properties and the trajectory, and displaying the predicted performance of the part.

In another aspect, the present disclosure provides a method for structurally analyzing a part, comprising (a) receiving a model of the part to be printed from a material consisting of at least a matrix; (b) receiving properties for the material; (c) determining a print head tool path for printing the part; (d) determining a trajectory of at least one stiffness-contributing portion of the material based on the print head tool path; (e) predicting a performance of the part based on the properties and also based on the trajectory of the at least one stiffness-contributing portion; and displaying the predicted performance of the part.

In another aspect, the present disclosure provides a non-transitory computer-readable medium storing instructions that are executable by at least one processor to cause the at least one processor to perform a method for structurally analyzing a part, the method comprising (a) receiving a model of the part to be printed from a material consisting of at least a matrix; (b) receiving properties for the material; (c) determining a print head tool path for printing the part; (d) determining a trajectory of at least one stiffness-contributing portion of the material based on the print head tool path; (e) predicting a performance of the part based on the properties and also based on the trajectory of the at least one stiffness-contributing portion; and (f) displaying the predicted performance of the part.

In another aspect, the present disclosure provides a system for structurally analyzing a part. The system may include a display, a memory having computer-executable instructions stored thereon, and a processor in communication with the display and configured to execute the stored instructions to receive a model of the part to be printed from a material comprising a matrix and at least one fiber, to receive material properties for the matrix and at least one fiber, to receive intended or predetermined use information associated with the part, and to determine a print head tool path for printing the part. In some cases, the material consists of the matrix and at least one fiber. The processor may also execute the stored instructions to generate a virtual mesh of analytic elements within the model of the part, to determine the trajectory of the at least one fiber through each of the analytic elements based on the print head tool path, and to determine a three-dimensional stiffness of each of the analytic elements based on the trajectory of the at least one fiber through each of the analytic elements and based on the material properties for the matrix and the at least one fiber. The processor may further execute the stored instructions to predict at least one of a stress field and a displacement field of the part based on aggregation of the three-dimensional stiffnesses of the analytic elements and the intended use information, and to show on the display a graphical representation of the predicted at least one of the stress field and the displacement field of the part overlapped with the model of the part and the print head tool path.

Consistent with other disclosed embodiments, non-transitory computer-readable storage media can store program instructions, which may be executed by a computer processor to perform any of the methods described herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 2-4 are perspective illustrations of exemplary tracks of material printed by the system of FIG. 1;

FIG. 4a is an enlarged illustration of a portion of FIG. 4;

DETAILED DESCRIPTION

Figure 1:
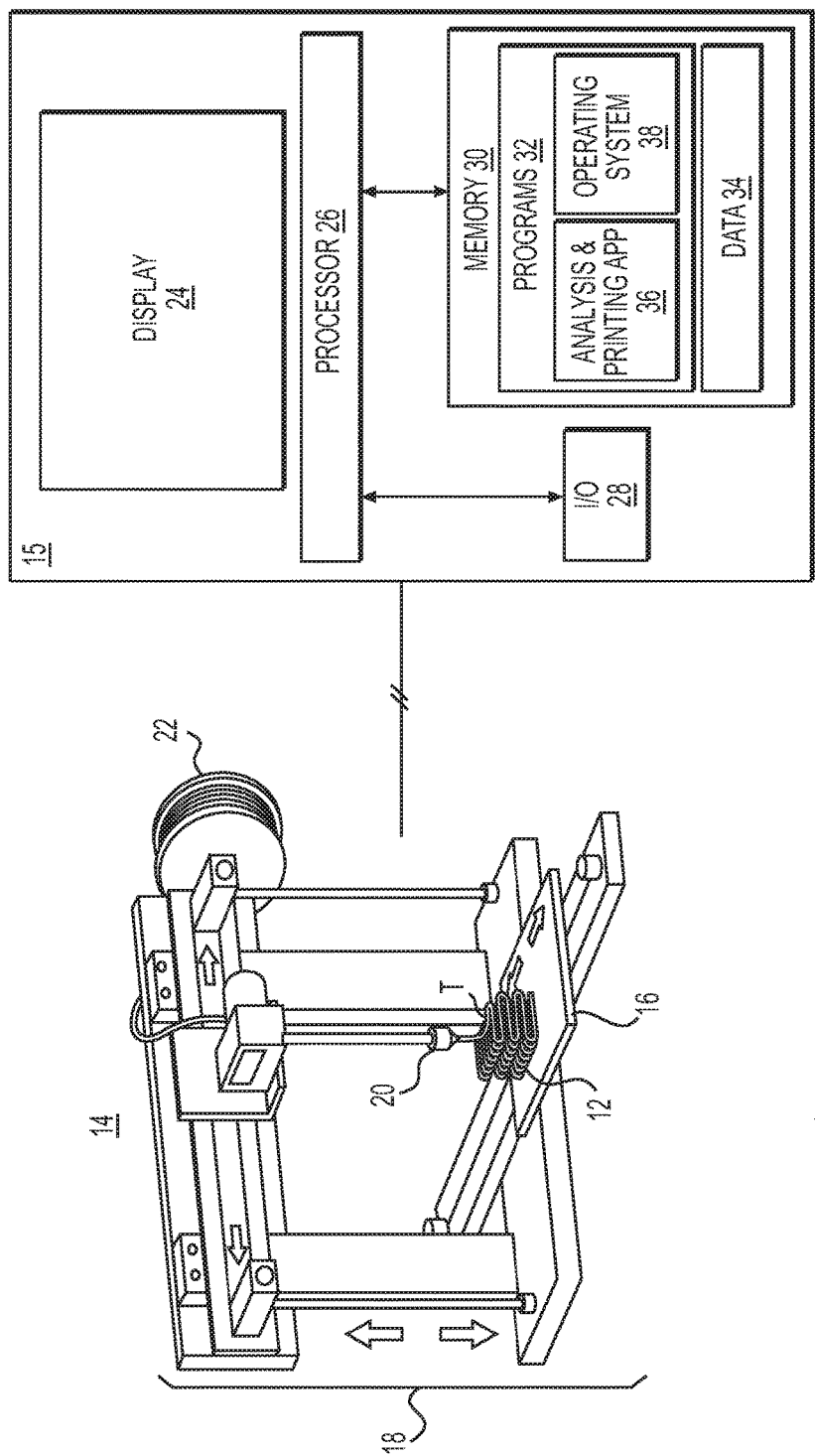
FIG. 1 is diagrammatic illustration of an exemplary disclosed system for making and/or analyzing printed parts.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional printing" (also "3D printing"), as used herein, generally refers to a process or method for generating a 3D part (or object). For example, 3D printing may refer to sequential addition of material layer or joining of material layers or parts of material layers to form a 3D structure, in a controlled manner (e.g., under automated control). In the 3D printing process, the deposited material can be fused, sintered, melted, bound or otherwise connected to form at least a part of the 3D object. Fusing the material may include melting or sintering the material. Binding can comprise chemical bonding. Chemical bonding can comprise covalent bonding. Examples of 3D printing include additive printing (e.g., layer by layer printing, or additive manufacturing). The 3D printing may further comprise subtractive printing.

Examples of 3D printing methodologies can comprise extrusion, wire, granular, laminated, light polymerization, or power bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Power bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP) or laminated object manufacturing (LOM).

3D printing may be performed using various materials. In some examples, a material that may be used in 3D printing includes a polymeric material, elemental metal, metal alloy, a ceramic, an allotrope of elemental carbon, or a combination thereof. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The material may comprise an organic material, for example, a polymer or a resin. The material may comprise a solid or a liquid. The solid material may comprise powder material. The powder material may be coated by a coating (e.g., organic coating such as the organic material (e.g., plastic coating)). The powder material may comprise sand. The material may be in the form of a powder, wire, pellet, or bead. The material may have one or more layers. The material may comprise at least two materials. In some cases, the material includes a reinforcing material (e.g., that forms a fiber). The reinforcing material may comprise a carbon fiber, Kevlar®, Twaron®, ultra-high-molecular-weight polyethylene, or glass fiber.

The term "stiffness-contributing portion," as used herein, generally refers to an element that provides structural support to a part. A stiffness-contributing portion may be a fiber. The fiber may be continuous or discontinuous. The fiber can include one or more strands, such as one or more strands of a polymeric material. The fiber may include a plurality of strands.

FIG. 1 illustrates an exemplary system 10, which may be used to make and/or analyze a part 12 having any desired shape, size, and structure. System 10 may include, among other things, a printer 14 and at least one computing device 15. Printer 14 may be configured to create part 12 under the guided control of computing device 15, for example by way of an additive manufacturing process. Although a reinforced filament fusion (RFF) process will be described below as one example of how part 12 may be created or generated, other processes may alternatively be utilized for this purpose. Examples of methods, systems and materials that may be used to create or generate objects or parts herein, including part 12, are provided in U.S. Patent Publication Nos. 2014/0232035, 2016/0176118, and U.S. patent application Ser. Nos. 14/297,185, 14/621,205, 14/623,471, 14/682,067, 14/874,963, 15/069,440, 15/072,270, 15/094,967, each of which is entirely incorporated herein by reference.

Printer 14 may be comprised of components that are controlled to create part 12 layer-by-layer using RFF technology. Specifically, printer 14 may include a support 16, a drive 18, and one or more heads 20. Each head 20 may be coupled to support 16 via drive 18. In the context of FIG. 1, drive 18 is an overhead gantry capable of moving head 20 in multiple directions during fabrication of part 12. Although drive 18 is shown as being capable of 3-axis movement, it is contemplated that any other type of drive 18 (e.g., a robotic arm, an arm/gantry combination, etc.) capable of moving head 20 in the same or a different manner may also be utilized, if desired.

Each head 20 (only one shown in FIG. 1, for clarity) may be configured to discharge at least a matrix material. For the purposes of this disclosure, a matrix material may be any material that can be discharged from head 20 and include, for example, a resin, a polymer, concrete, a metal slurry, etc. The matrix material may be a singular homogenous material. As an alternative, the matrix material may be mixed with, contain, or otherwise coat one or more reinforcements (e.g., continuous or chopped fibers, such as carbon fibers, glass fibers, metallic fibers, etc.). The matrix material and the fiber(s) may be supplied to head 20 from a common source 22 (as a fiber core coated with a solid thermoplastic sleeve). As an alternative, the matrix material and fiber(s) may be provided separately. The matrix material may be supplied in a solid, plastic, or liquid state, and head 20 may be capable of liquefying (e.g., melting) the matrix material. The fiber(s) may be coated with the matrix material before and/or while passing through head 20. As the matrix-coated reinforcements(s) discharge from head 20, the matrix material may harden.

Drive 18 may move head 20 in a particular trajectory (e.g., a trajectory corresponding to an intended shape and size of part 12) at the same that the matrix-coated fiber(s) discharge from head 20, such that continuous tracks T of matrix-coated fiber(s) are formed along the trajectory. These tracks T of matrix-coated fiber(s) can be laid adjacent and/or on top of each other while the matrix is still in a liquid or semi-liquid state. The adjacent tracks T of matrix-coated fiber(s) form a connected layer, and the overlapping layers are built up to form part 12.

Exemplary tracks T are illustrated in FIGS. 2-4. In particular, FIG. 2 illustrates an example track T having three continuous fibers F coated in a matrix material M. It is contemplated that track T of FIG. 1 may have any number of fibers F (e.g., only one), and that the fibers F may be radially dispersed with the matrix M or located at a general center thereof. FIG. 3 illustrates another example track T having chopped fibers F coated in matrix material M. It is contemplated that track T of FIG. 2 may have any number and lengths of fibers F, and that the fibers F may be radially dispersed with the matrix M. FIG. 4 illustrates another example track T, which does not include any fibers (i.e., that includes only the matrix material M).

It has been determined that a trajectory of portions of the material that make up each of the tracks T shown in FIGS. 2-4 may contribute to a characteristic (e.g., a stiffness) of part 12. In FIG. 2, the stiffness-contributing portions are the continuous fibers F. In particular, the continuous fibers F, because of the way in which they are fed through head 20 (referring to FIG. 1) and deposited within elongated tracks T, are generally aligned with the tool path of head 20. This general alignment may function to increase a stiffness of tracks T in an axial direction. In FIG. 3, the stiffness-contributing portions are the chopped fibers F. Specifically, although the chopped fibers F of FIG. 2 may not be as aligned with the tool path of head 20 as the continuous fibers F may be (e.g., because of their shorter lengths and disconnected nature), the chopped fibers F may still align somewhat with the tool path because of the way in which the chopped fibers F are fed through head 20 (referring to FIG. 2). In some cases, the chopped fibers F have been shown to align by as much as 75-90% with the tool path of head 20. This general alignment, like the alignment of the continuous fiber F, may also function to increase a stiffness of tracks T in an axial direction. In FIG. 4, the stiffness-contributing portions are polymer chains PC (see FIG. 4a) that make up the matrix M. In particular, the polymer chains PC, like the chopped fibers F, may still be caused to generally align with the tool path of head 20 during flow of the matrix M flows through head 20. This general alignment, like the alignment of the continuous fiber F and the chopped fibers F, may also function to increase a stiffness of tracks T in an axial direction. It should be noted that, although not shown in FIGS. 2 and 3, the polymer chains PC may still exist and contribute to the stiffness of tracks T, along with the continuous and/or chopped fibers F.

The alignment of the continuous fibers, chopped fibers, and polymer chains, along with properties of the matrix, properties of the fiber(s), a ratio of fiber volume-to-matrix volume within each track, etc., may have an effect on a performance (e.g., a strength, a deformation, a deflection, etc.) of part 12. Accordingly, the performance of part 12 may be selectively adjusted by adjusting the trajectory of head 20 during layer formation and/or adjusting the properties of the matrix, the properties of the fiber(s), the ratio of fiber area-to-matrix area, etc.

Any number of separate computing devices 15 may be used to control the trajectory of head 20 during formation of part 12 and/or to analyze the performance characteristics of part 12 before and/or after formation. Computing device 15 may include a display 24, one or more computer processors ("processors") 26, any number of input/output ("I/O") devices 28, and one or more memories 30 for storing programs 32 and data 34. Programs 32 may include, for example, any number of analysis and/or printing apps 36 and an operating system 38.

Display 24 of computing device 15 may include a liquid crystal display (LCD), a light emitting diode (LED) screen, an organic light emitting diode (OLED) screen, and/or another display device. Display 24 may be used for display of data under the control of processor 26.

Computer processor ("processor") 26 may be a single or multi-core processor, in some cases configured with virtual processing technologies, and use logic to simultaneously execute and control any number of operations. Processor 26 may be configured to implement virtual machine or other technologies to execute, control, run, manipulate, and store any number of software modules, applications, programs, etc. In addition, in some cases, processor 26 may include one or more specialized hardware, software, and/or firmware modules (not shown) specially configured with particular circuitry, instructions, algorithms, and/or data to perform functions of the disclosed methods. It is appreciated that other types of processor arrangements may be implemented that provide for the capabilities disclosed herein.

Memory 30 can be a volatile or non-volatile, magnetic, semiconductor, tape, optical, removable, non-removable, or other type of storage device or tangible and/or non-transitory computer-readable medium that stores one or more executable programs 32, such as analysis and/or printing apps 36 and operating system 38. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, and EPROM, a FLASH-EPROM or other flash memory, NVRAM, a cache, a register or other memory chip or cartridge, and networked versions of the same.

Memory 30 may store instructions that enable processor 26 to execute one or more applications, such as analysis and/or printing applications 36, operating system 38, and any other type of application or software available or executable on computer systems. Alternatively or additionally, the instructions, application programs, etc. can be stored in an internal and/or external database (e.g., a cloud storage system—not shown) that is in direct communication with computing device 15, such as one or more databases or memories accessible via one or more networks (not shown). Memory 30 can include one or more memory devices that store data and instructions usable to perform one or more features provided herein. Memory 30 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

Computing device 15 may be communicatively connected to one or more remote memory devices (e.g., remote databases—not shown) through a network. The remote memory devices can be configured to store information that computing device 15 can access and/or manage. By way of example, the remote memory devices may be document management systems, Microsoft SQL database, SharePoint databases, Oracle™ databases, Sybase™ databases, Cassandra, HBase, or other relational or non-relational databases or regular files. Systems and methods provided herein, however, are not limited to separate databases or even to the use of a database.

Programs 32 may include one or more software or firmware modules causing processor 26 to perform one or more functions disclosed herein. Moreover, processor 26 can execute one or more programs located remotely from computing device 15. For example, computing device 15 can access one or more remote programs that, when executed, perform one or more functions disclosed herein. In some cases, programs 32 stored in memory 30 and executed by processor 26 can include one or more of analysis and/or printing apps 36 and operating system 38. Analysis and/or printing apps 36 may cause processor 26 to perform one or more functions of the disclosed methods.

Operating system 38 may perform operating system functions when executed by one or more processors such as processor 26. By way of example, operating system 38 may include Microsoft Windows™, Unix™, Linux™, OSX™, and IOS™ operating systems, Android™ operating systems, or another type of operating system 38. Accordingly, disclosed embodiments can operate and function with computer systems running any type of operating system 38.

I/O devices 28 may include one or more interfaces for receiving signals or input from a user and/or printer 14, and for providing signals or output to printer 14 that allow part 12 to be printed. For example, computing device 15 can include interface components for interfacing with one or more input devices, such as one or more keyboards, mouse devices, and the like, which enable computing device 15 to receive input from a user (not shown).

Figure 5:
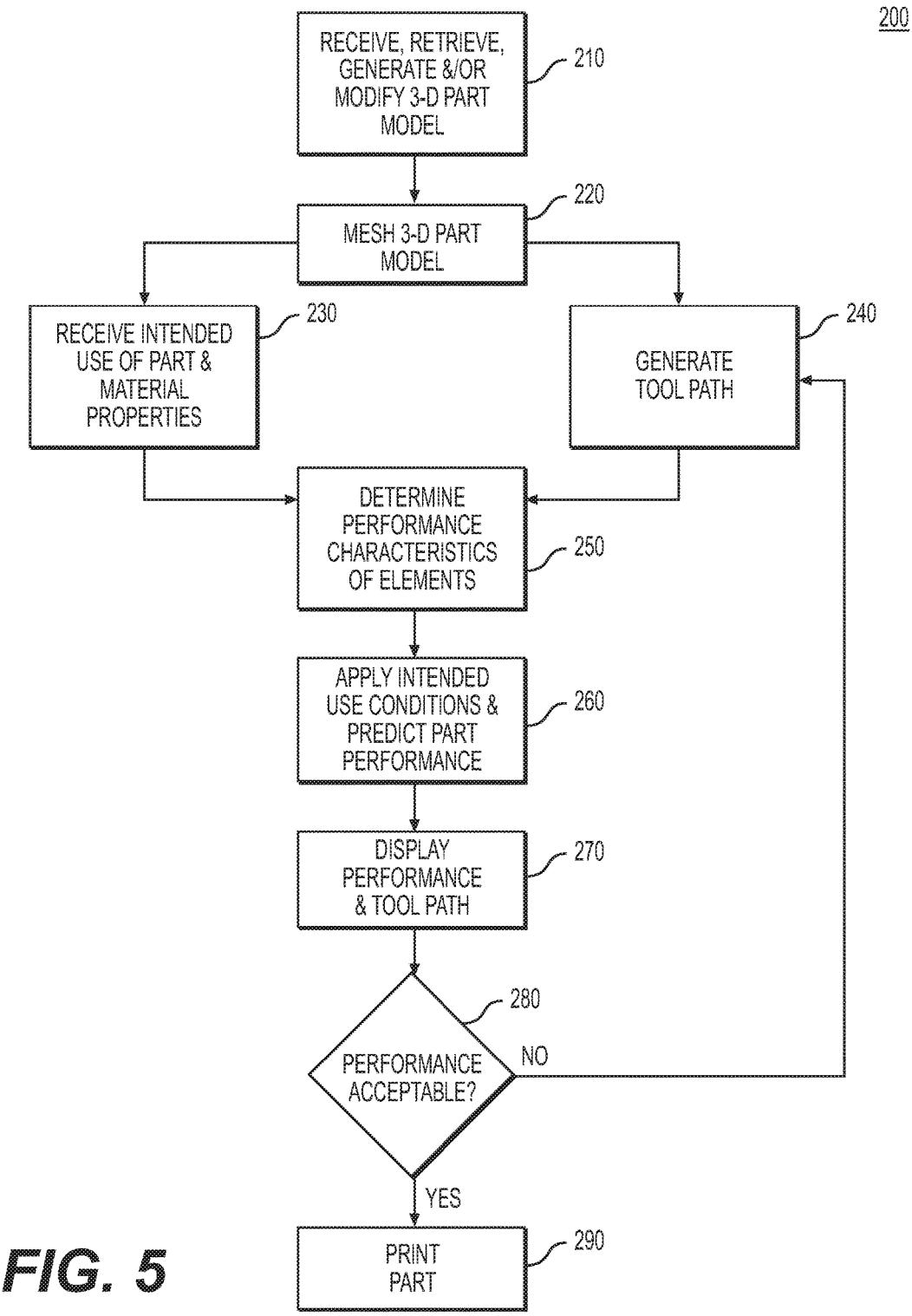
FIG. 5 is a flowchart depicting an exemplary method that may be performed by the system of FIG. 1 during the making and/or analyzing of the printed part.
Figure 6:
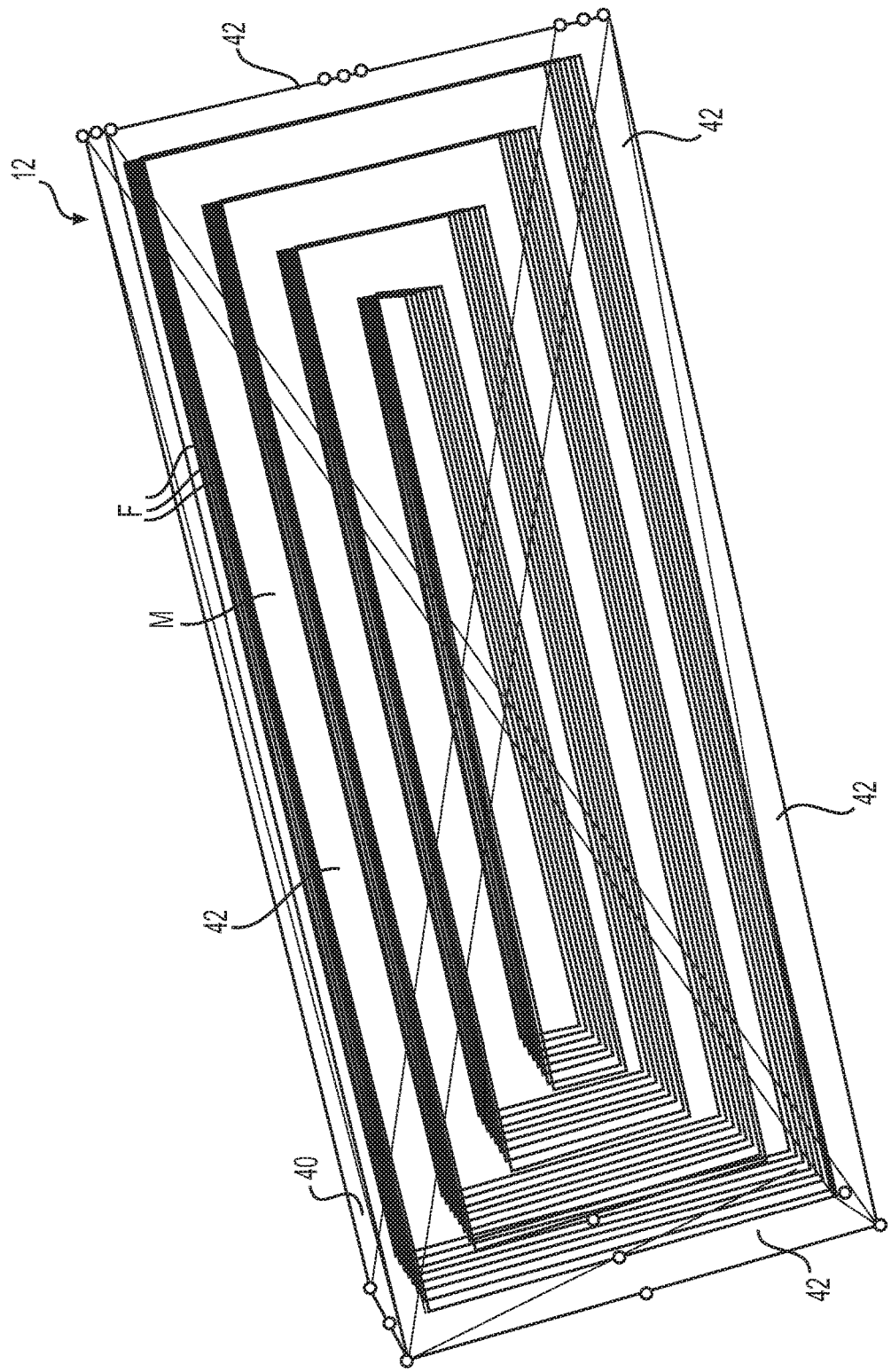
FIG. 6 is a perspective illustration of an exemplary disclosed part model that may be generated during analysis by the system of FIG. 1.
Figure 7:
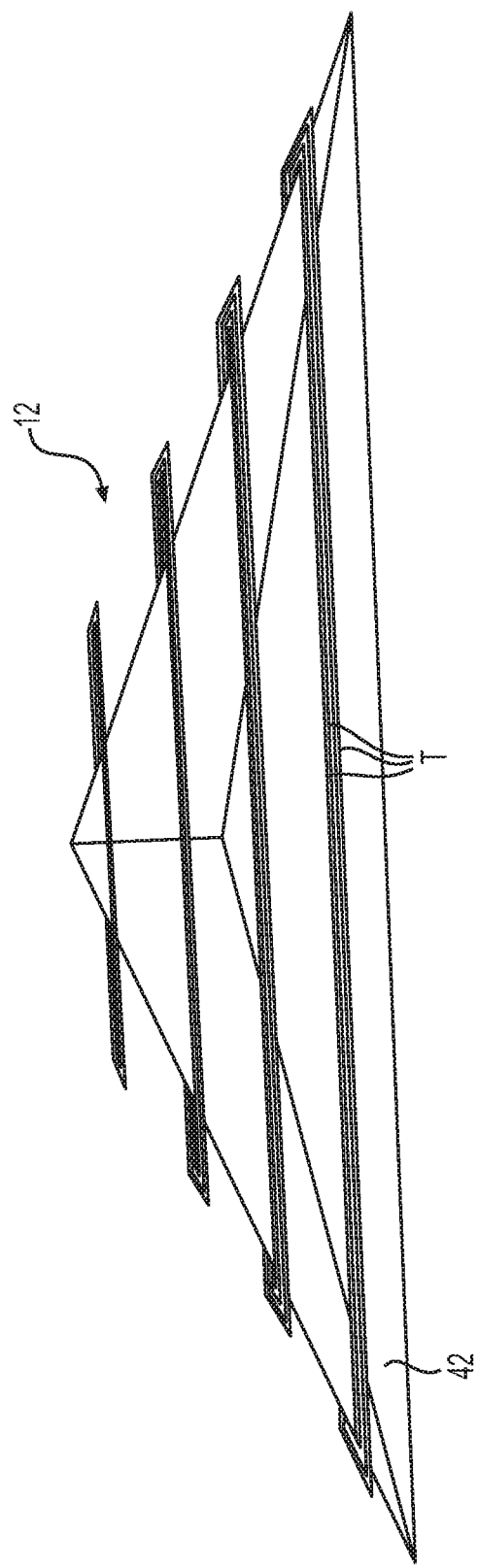
FIG. 7 is a perspective illustration of an exemplary disclosed analytic element of the part model shown in FIG. 6.
Figure 8:
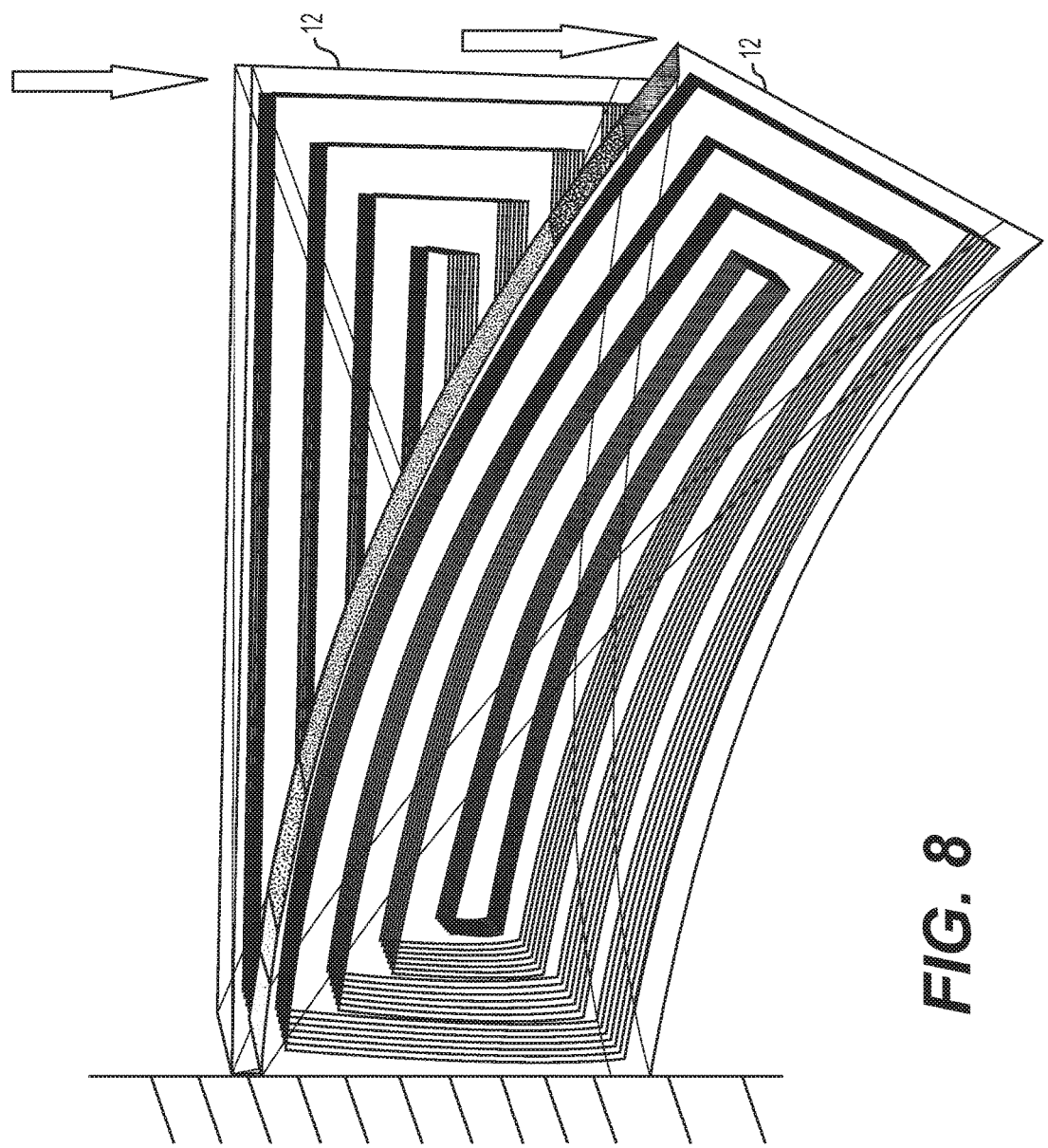
FIG. 8 is a perspective illustration of the part model of FIG. 6 showing determined performance when intended use conditions are applied.

FIG. 5 is flow chart depicting a method 200 that may be implemented by computing device 15 to fabricate part 12 via printer 14 and/or to analyze part 12. FIGS. 6-8 represent virtual models of part 12 that may be generated by computing device 15 when following method 200. The virtual model may be a computer-generated model design of the part 12.

The disclosed systems and methods may be used to manufacture and/or analyze high-performance parts (e.g., parts with or without reinforcing fibers) of any shape and size. Performance analysis of the parts may be performed by the disclosed system before, during, and/or after fabrication. In this manner, the parts may be produced with a higher level of confidence regarding performance in an intended application and with less time and expense. Operation of system 10 will now be described in detail, with respect to method 200 shown in FIG. 5.

As can be seen in FIG. 5, information regarding part 12 may be received into system 10 (Operation 210). This information may include, among other things, a three-dimensional model 40 (shown in FIG. 6) of part 12. The three-dimensional model 40 may be a model design of the part 12, such as a computer-generated design of the part 12. In the exemplary model 40 shown in FIG. 6, the matrix used to make part 12 is represented by a symbol M, while the tracks T correspond to a center-line trajectory. Model 40 may be received as a collection of data that is interpretable by processor 26 using programs 32 (e.g., app 36), the code defining physical attributes (e.g., shape and size) of part 12. Model 40 may be received by way of I/O devices 28 or a network connection, retrieved by processor 26 from memory 30, and/or generated and modified by processor 26 using programs 32.

Processor 26 may use programs 32 to create a virtual mesh of connected analytic elements 42 (shown in FIGS. 6 and 7) within model 40 (Operation 220). Analytic elements 42 may be three-dimensional tetrahedrons. It is contemplated, however, that any size and number of two- and/or three-dimensional analytic elements 42 may be assembled to form the virtual mesh. The analytic elements 42 may have various shapes, such as, for example, circles, triangles, squares, quadrilaterals, tetrahedrons, quadrilateral pyramids, triangular prisms, hexahedrons, or partial shapes or combinations of shapes thereof.

Information regarding an intended (or predetermined) use of part 12 (e.g., constraints—shown on the left of FIG. 8, and forces—shown on the right in FIG. 8) and material properties of part 12 (e.g., matrix properties, fiber properties, matrix/fiber ratios) and tool path trajectories may be received by processor 26 (Operation 230). The material properties may include a type of material, viscosity of the material, melting point of the material, stiffness of the material, Young's moduli of the material, composition of the material, Poisson's ratios, shear moduli, density, coefficients of thermal expansion, thermal conductivity, specific heat, and viscoelastic properties. In an example, the intended or predetermined use of the part includes a functional attribute of the part, such as use of the part in a larger object, structure or system, or use of the part as a standalone object. Like model 40, the intended use and material properties information of part 12 may be received by way of I/O devices 28 or a network connection, retrieved by processor 26 from memory 30, and/or created and modified by processor 26 using programs 32. For example, the constraints, forces, matrix properties, fiber properties, and matrix/fiber ratios may be manually input by a user of computing device 15. One or more of the properties may be derived by stress testing of standardized bars, and then stored for later retrieval during analysis.

As shown in FIGS. 6 and 7, the stiffness-contributing portions (e.g., the continuous fibers, the chopped fibers, and/or the polymer chains) deposited in general alignment with the center-line of track T by head 20 during fabrication of part 12 may pass through each analytic element 42 differently. For example, some analytic elements 42 may contain a greater or lesser number of stiffness-contributing portions than other elements 42, and the stiffness-contributing portions may pass through the different analytic elements 42 at different locations and angles. This arrangement of stiffness-contributing portions within each analytic element 42 may provide each analytic element 42 with different local characteristics (e.g., stiffness). The local characteristics of each analytic element 42 may aggregate to produce global characteristics of part 12. Accordingly, in order to solve for the global characteristics of part 12, the arrangement (e.g., number, density, alignment, etc.) of stiffness-contributing portions within each analytic element 42 and the corresponding effect of the arrangement may first be determined.

A stiffness of the elements 42 scales with the number and/or distribution of stiffness-contributing portions. For example, a first element with a greater number of stiffness-contributing portions as compared to a second element may be more stiff than the second element. As an alternative or in addition, the orientation of individual stiffness-contributing portions relative to one another may determine the stiffness of the elements. In an example, the elements 42 include a plurality of stiffness-contributing portions that are parallel or substantially parallel to one another, which may yield a stiffness that is different than a scenario in which the stiffness-contributing portions are not parallel to another (e.g., the stiffness-contributing portions are perpendicular to one another).

The arrangement of fibers within each analytic element 42 may be represented as a set of intersection points (i.e., points where each fiber intersects each analytic element 42 and/or each other) and directional vectors. The intersection points and directional vectors may be determined as a function of the virtual mesh created at operation 220 and a tool path (intended or actual) of head 20. The tool path may be manually generated, automatically generated by processor 26 as a function of a size and shape of model 40 and known or predetermined capabilities of printer 14, and/or manually selected by the user from a listing of available tool paths that have been automatically generated. Tool path generation may take place at a Operation 240.

After receiving the intended use information, the material properties information, and the tool path information, processor 26 may be configured to determine performance characteristics of each analytic element 42 (Operation 250). This may include, among other things, solving for the locations of the intersection points and the directional vectors described above. This is solved based on 3D geometry based algorithms (e.g., creating a convex hull from intersection points between a tetrahedron and a hexahedron, and then subsequently computing a volume of the convex hull to determine a filament contribution to the stiffness of the element). In addition, processor 26 may use the intersection points, the directional vectors, and the fiber properties (e.g., an assumed rectangular, circular, or oval cross-sectional fiber area) to determine a volume of the fibers and a remaining volume of the matrix encompassed within each analytic element 42. Further, processor 26 may determine, based also on the intersection points, the directional vectors, the fiber properties (e.g., compressive and/or tensile stiffness), and the matrix properties, the combined contributions of the fibers and the matrix to a three-dimensional stiffness of each analytic element 42.

Processor 26 may then apply the intended use conditions (e.g., the constraints and forces received at operation 230) at corresponding nodes and/or surfaces of analytic elements 42 in the mesh of model 40 (see FIG. 5), and determine (e.g., predict) the global performance of part 12 based on an aggregated stiffness of each individual analytic element 42 (Operation 260). For example, as seen in FIG. 5, model 40 of part 12 is shown as being constrained at a left end, with a force of a particular magnitude and direction being applied at a right end. Processor 26 may yield results in the form of nodal displacements and element stresses. The nodal displacements and element stresses may then be translated into fiber displacement fields and stress fields, which can be shown overlaid with model 40 on display 24 (Operation 270). For example, model 40 is shown in FIG. 5 having a displacement of a particular distance in a direction generally aligned with the applied force direction. In addition, model 40 has been shaded and/or colored in FIG. 5 to illustrate stresses at different locations within part 12 that are caused by the displacement. The tool path generated at operation 240 may also be shown at this time, in connection with the displacement fields and/or stress fields.

The displacement and/or stress fields may be viewed in a variety of ways. For example, a user interface, such as a graphical user interface or web-based user interface, may be provided that includes a slider (e.g., an actual or virtual slider), which can be moved by a user (e.g., left to right) to generate a viewing control instruction. Based on the viewing control instruction, a virtual progression of part 12 may be generated showing how part 12 will be printed and corresponding displacement and/or stress fields inside of part 12. In other words, the predicted performance of part 12 may be shown overlapped with only a portion of the print head tool path on part 12, the portion corresponding to a position of the slider.

Processor 26 may be configured to implement an optimization operation using the results of operation 260. Specifically, processor 26 may be configured to determine if the predicted performance of part 12 is acceptable (Operation 270), and to selectively repeat method 200 using a different tool path (and corresponding fiber trajectories) when the predicted performance is unacceptable. For example, processor 26 may compare one or more predicted performance parameters (e.g. stress field and/or displacement field) to one or more design criteria (maximum displacement field, maximum stress field, etc.). When the comparison indicates that part 12 is likely to perform poorly, processor 26 may return to operation 240 and generate an alternative tool path. Control may then loop through operations 240-280 until acceptable part performance is determined, at which point processor 26 may cause printer 14 to fabricate part 12 using the corresponding tool path (Operation 290).

In some cases, while the part 12 is printed, the performance of the part may be determined and used to update the tool path. In principle, this may be used to optimize fabrication of the part 12.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for structurally analyzing and printing a part, comprising:

(a) receiving, in computer memory, a model of the part for three-dimensional printing from a material comprising a matrix and fiber material;
   (b) receiving, in computer memory, one or more properties for the material;
   (c) using the model, determining a print head tool path for use during the three-dimensional printing of the part;
   (d) generating a virtual mesh of analytic elements within the model of the part and determining a trajectory of at least one stiffness-contributing portion of the material based at least in part on the print head tool path, wherein the trajectory of the at least one stiffness-contributing portion is determined through each of the analytic elements in the virtual mesh;
   (e) using one or more computer processors to determine a performance of the part based at least in part on the one or more properties received in (b) and the trajectory of the at least one stiffness-contributing portion determined in (d);
   (f) electronically outputting the performance of the part determined in (e); and
   (g) using a print head to print the part along the print head tool path.

2. The method of claim 1, wherein the at least one stiffness-contributing portion is at least one of a continuous fiber, chopped fibers, and polymer chains.

3. The method of claim 1, further comprising determining a three-dimensional stiffness of each of the analytic elements based at least in part on (i) the trajectory of the at least one stiffness-contributing portion through each of the analytic elements and (ii) the one or more properties of the material and the at least one stiffness-contributing portion, wherein (e) comprises determining the performance of the part based at least in part on an aggregation of three-dimensional stiffnesses of each of the analytic elements.

4. The method of claim 3, wherein determining the three-dimensional stiffness of each of the analytic elements comprises:

determining intersection points and directional vectors of the at least one stiffness-contributing portion within each of the analytic elements;
   determining a volume of the analytic elements consumed by the at least one stiffness-contributing portion using the intersection points; and
   determining the three-dimensional stiffness of each of the analytic elements using the volume of the analytic elements consumed by the at least one stiffness-contributing portion, the one or more properties of the material, one or more properties of the at least one stiffness-contributing portion, and the directional vectors.

5. The method of claim 1, wherein the performance of the part determined in (e) comprises at least one of a displacement field and a stress field of the part.

6. The method of claim 5, further comprising receiving use information for the part, and wherein (e) comprises determining at least one of the displacement field and the stress field of the part based at least in part on the use information.

7. The method of claim 1, wherein (f) comprises displaying the performance of the part determined in (e) on a user interface.

8. The method of claim 7, wherein displaying the performance of the part comprises displaying on the user interface a graphical representation of the performance determined in (e) overlapped with one or more of the model of the part and the print head tool path.

9. The method of claim 7, further comprising:
receiving a control instruction from a user regarding viewing of progression of the print head during virtual three-dimensional printing of the part; and
responsively displaying on the user interface the performance overlapped with a corresponding portion of the print head tool path on the part.

10. The method of claim 1, further comprising:
generating a comparison of the performance of the part against a reference performance; and
using the comparison to generate an additional print head tool path.

11. The method of claim 1, wherein the print head additively prints the part.

12. The method of claim 1, wherein the part is printed if the performance determined in (e) meets a reference performance.

13. The method of claim 1, further comprising receiving instruction(s) from a user to print the part prior to using the print head to print the part.

14. The method of claim 1, wherein the material further comprises a fiber.

15. A non-transitory computer-readable medium comprising machine-executable code that, upon execution by one or more computer processors, implements a method for structurally analyzing and printing a part, the method comprising:
(a) receiving, in computer memory, a model of the part for three-dimensional printing from a material comprising a matrix and fiber material;
(b) receiving, in computer memory, one or more properties for the material;
(c) using the model, determining a print head tool path for use during the three-dimensional printing of the part;
(d) generating a virtual mesh of analytic elements within the model of the part and determining a trajectory of at least one stiffness-contributing portion of the material based at least in part on the print head tool path, wherein the trajectory of the at least one stiffness-contributing portion is determined through each of the analytic elements in the virtual mesh;
(e) determining a performance of the part based at least in part on the one or more properties received in (b) and the trajectory of the at least one stiffness-contributing portion determined in (d);
(f) electronically outputting the performance of the part determined in (e); and
(g) using a print head to print the part along the print head tool path.

16. The non-transitory computer-readable medium of claim 15, wherein the at least one stiffness-contributing portion is at least one of a continuous fiber, chopped fibers, and polymer chains.

17. The non-transitory computer-readable medium of claim 15, wherein the method further comprises determining a three-dimensional stiffness of each of the analytic elements based at least in part on (i) the trajectory of the at least one stiffness-contributing portion through each of the analytic elements and (ii) the one or more properties of the material and the at least one stiffness-contributing portion, wherein (e) comprises determining the performance of the part based at least in part on aggregation of three-dimensional stiffnesses of each of the analytic elements.

18. The non-transitory computer-readable medium of claim 17, wherein determining the three-dimensional stiffness of each of the analytic elements comprises:
determining intersection points and directional vectors of the at least one stiffness-contributing portion within each of the analytic elements;
determining a volume of the analytic elements consumed by the at least one stiffness-contributing portion using the intersection points; and
determining the three-dimensional stiffness of each of the analytic elements using the volume of the analytic elements consumed by the at least one stiffness-contributing portion, the one or more properties of the material, one or more properties of the at least one stiffness-contributing portion, and the directional vectors.

19. The non-transitory computer-readable medium of claim 15, wherein:
the performance of the part determined in (e) comprises at least one of a displacement field and a stress field of the part.

20. The non-transitory computer-readable medium of claim 19, wherein the method further comprises receiving use information for the part, and wherein (e) comprises determining at least one of the displacement field and the stress field of the part based at least in part on the use information.

21. The non-transitory computer-readable medium of claim 15, wherein (f) comprises displaying the performance of the part determined in (e) on a user interface.

22. The non-transitory computer-readable medium of claim 21, wherein displaying the performance of the part comprises displaying on the user interface a graphical representation of the performance determined in (e) overlapped with one or more of the model of the part and the print head tool path.

23. The non-transitory computer-readable medium of claim 21, wherein the method further comprises:
receiving a control instruction from a user regarding viewing of progression of the print head during virtual three-dimensional printing of the part; and
responsively displaying on the user interface the performance overlapped with a corresponding portion of the print head tool path on the part.

24. The non-transitory computer-readable medium of claim 15, wherein the method further comprises:
generating a comparison of the performance of the part against a reference performance; and
generating an additional print head tool path using the comparison.

25. The non-transitory computer-readable medium of claim 15, wherein the part is printed if the performance determined in (e) meets a reference performance.

26. A system for structurally analyzing and printing a part, comprising:
computer memory comprising computer-executable instructions stored therein for analyzing and printing the part;
one or more computer processors in electrical communication with the computer memory and programmed to execute the computer-executable instructions to:
(a) receive, in the computer memory, a model of the part for three-dimensional printing from a material comprising a matrix and fiber material;
(b) receive, in the computer memory, one or more properties of the material;
(c) using the model, determine a print head tool path for use during the three-dimensional printing of the part;
(d) generate a virtual mesh of analytic elements within the model of the part and determine a trajectory of at least one stiffness-contributing portion of the material based at least in part on the print head tool path, wherein the trajectory of the at least one stiffness-contributing portion is determined through each of the analytic elements in the virtual mesh;
(e) determine a performance of the part based at least in part on the one or more properties received in (b) and the trajectory of the at least one stiffness-contributing portion determined in (d); and
(f) electronically output the performance of the part determined in (e); and
(g) using a print head to print the part along the print head tool path.

27. The system of claim 26, wherein the one or more computer processors are programmed to execute the computer-executable instructions to determine a three-dimensional stiffness of each of the analytic elements based at least in part on (i) the trajectory of the at least one stiffness-contributing portion through each of the analytic elements and (ii) the one or more properties of the material and the at least one stiffness-contributing portion.

28. The system of claim 27, wherein the one or more computer processors are programmed to execute the computer-executable instructions to determine the performance of the part based at least in part on an aggregation of three-dimensional stiffnesses of each of the analytic elements.

29. The system of claim 26, wherein the one or more computer processors are programmed to execute the computer-executable instructions to receive instruction(s) from a user to print the part prior to using the print head to print the part.

* * * * *